United States Patent [19]
Giller et al.

[11] 3,883,673
[45] May 13, 1975

[54] STABILIZATION OF CAROTENE

[76] Inventors: Solomon Aronovich Giller, ulitsa Pernavas 10, kv. 76; Gunar Yanovich Dubur, ulitsa Suvorova 117, kv. 12, both of Riga; Yan Rikhardovich Uldrikis, ulitsa Darza, 2, kv. 2, Elgava; Gunar Jamovich Tirzit, ulitsa Zhagatu, 22, kv. 33, Riga; Andrei Robertovich Valdman, ulitsa Lenina, 167, Riga; Ivan Markovich Zakharchenko, ulitsa P. Stuckhi, 9/11, kv. 4, Riga; Yazep Yanovich Spruz, ulitsa Lenina, 103, kv. 8, Rezekne; Vitaly Evgenievich Ronis, ulitsa Ermolovoi, 17, kv. 66, Moscow; Alexandr Andrejevich Makarov, P/o Lugovaya, 3, Moskovskaya Oblast, all of U.S.S.R.

[22] Filed: May 4, 1973

[21] Appl. No.: 357,271

Related U.S. Application Data

[62] Division of Ser. No. 269,391, July 6, 1972, abandoned, which is a division of Ser. No. 55,288, July 15, 1970, abandoned.

[30] Foreign Application Priority Data
July 22, 1969 U.S.S.R............................ 1352174

[52] U.S. Cl............. 426/311; 252/403; 260/666 C; 426/182; 426/197; 426/210; 426/228; 426/268
[51] Int. Cl................................................. A23l 1/26
[58] Field of Search .......... 426/182, 194, 197, 210, 426/328, 228, 227, 311, 268; 260/666 C, 295 R, 584, 295.5 R, 297 R; 252/403, 405

[56] References Cited
UNITED STATES PATENTS

2,075,359  3/1937  Salzberg et al. ............... 260/584 X
2,198,214  4/1940  Musher ............................ 426/210
2,562,970  8/1951  Thompson ...................... 426/182
3,325,288  6/1967  Tung ............................... 426/182 X
3,438,781  4/1969  MacMillan et al. ............. 426/328 X

OTHER PUBLICATIONS

Chem. Abstracts, Vol. 51, (19), 10,213g–10,214f, 10–1957.
Chem. Abstracts, Vol. 53, (11), 14,713c to 14,713h, 6–1959.
Merck Index, Seventh Ed., pg. 1434, 1960.
Chem. Abstracts, Vol. 70, (7), 28,779e, 2–1969.
Chem. Abstracts, Vol. 69, (15), 59,104q, 10–1968.

*Primary Examiner*—S. Leon Bashore
*Assistant Examiner*—Arthur L. Corbin
*Attorney, Agent, or Firm*—Holman & Stern

[57] ABSTRACT

Stabilizers for carotene, which retard its oxidation and protect it against destruction, and which are 3,5-dicarbonyl derivatives of 2,6-dimethyl-1,4-dihydropyridine, conforming to the general formula

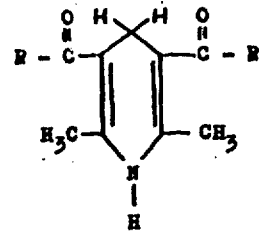

where R is a lower alkyl, such as methyl, or an alkoxy, such as an ethoxy group, are introduced into fodder products, such as grass flour, or oil solutions in order to preserve nutritive properties of such products or solutions.

2 Claims, No Drawings

STABILIZATION OF CAROTENE

This is a divisional of application Ser. No. 269,391, filed July 6, 1972, now abandoned which in turn is a divisional of application Ser. No. 55,288, filed July 15, 1970, now abandoned.

The present invention relates to antioxidants, and more particularly to carotene stabilizers.

The present invention has a particular reference to the stabilization of carotene in oil solutions, in fodder, and in any other carotene-containing products.

The problem of carotene preservation in fodder products under long-term storage conditions is of great importance for the national economy.

Carotene is known to be an important component of fodder products, being essential for the normal development of farm animals. However, easy oxidizability of carotene results in considerable losses thereof under storage conditions of fodder products. Therefore stabilization of carotene in such preparations as oil solutions, and stabilization of carotene in grass flour or in products containing grass flour, prove to be of great importance for further development of animal husbandry.

For preserving carotene in grass flour and in those fodder which comprise grass flour, a number of stabilizers have been proposed, ethoxychin (1,2-dihydro-6-ethoxy-2,2,4-trimethylquinoline) being most widely used for this purpose.

Ethoxychin was proposed (cf. E. M. Bickoff, A. L. Livingston, J. Guggolz, C. R. Thompson, J. Agr. and Food Chem., 1954, 2, 1229) as a most effective fodder antioxidant for stabilizing carotene of alfalfa.

A method of stabilizing carotene in grass flour with ethoxychin introduced thereinto in the form of a solution is disclosed in M. S. TZhedek, Author's Certificate of the USSR No. 217270, 1967.

Said substance exhibits a good stabilizing effect, but proves to be somewhat toxic when administered per os to white mice. Moreover, it should be noted, that the process of producing ethoxychin is rather complicated and requires the use of vacuum distillation techniques. The production of ethoxychin is also associated with fire and explosion hazards. Ethoxychin is inconvenient in storage and handling, being a thick fluid, easily oxidizable, if stored in premises accessible to air.

The main object of the present invention is to provide a new stabilizer for preserving carotene in oil solutions, in fodder products, and in any other carotene-containing products, which stabilizer would be less toxic, more convenient for storage and transportation, while being not inferior to ethoxychin as to the effectiveness of carotene stabilization.

Said object is accomplished by using as carotene stabilizers 3,5-dicarbonyl derivatives of 2,6-dimethyl-1,4-dihydropyridines conforming to the general formula (I)

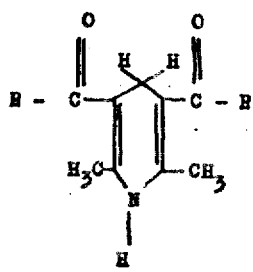

where R is a lower alkyl or an alkoxy.

The following compounds may be cited as separate representatives of the said group of carotene stabilizers:

2,6-dimethyl-3,5-diacetyl-1,4-dihydropyridine (II),
2,6-dimethyl-3,5-dicarboethoxy-1,4-dihydropyridine (III).

In stabilizing carotene in fodder products, the compound in the form of a solution in ethanol, isopropanol, or a vegetable oil is used in such an amount that the content of the stabilizer in the resulting fodder products is 0.2 g per kg. When stabilizing carotene in an oil, the compound is used in an amount of 0.04 percent by weight of the oil solution of carotene.

The stabilizing and antioxidant properties of the abovementioned compounds become manifest, when they are studied for thermal autooxidation of an oil solution of carotene. The compounds conforming to the general formula (I) were mixed in various concentrations with an oil solution of carotene, and the mixture was subjected to thermal autooxidation at a temperature of 70°C over a period of 72 hours. For comparing the results obtained in experiments with the use of the compounds conforming to the general formula (I), similar experiments were carried out with the use of ethoxychin.

For stabilizing carotene in grass flour, the latter, after drying, was mixed with a solution of compounds conforming to the general formula (I), then packaged in sacks and kept in storage premises. The content of carotene in the stabilized grass flour was periodically assayed. In a similar fashion grass flour was treated with ethoxychin, and the results were compared.

The results thus obtained have shown, that the herein-proposed compounds conforming to the general formula (I) exhibit stabilizing and antioxidant properties with respect to carotene, that is, said compounds inhibit autooxidation of carotene. Due to this, carotene-containing products do not lose their nutritive properties during a period as long as 6 months, this being quite sufficient for winter storages.

Toxicological investigations of the above-said compounds conforming to the general formula (1) have shown them to be non-toxic. Thus, when carrying out comparative studies of the acute toxicity of ethoxychin and 2,6-dimethyl-3,5-dicarboethoxy-1,4-dihydropyridine, we have established the $LD_{50}$ for ethoxychin, when administered per os to white mice, to be 2,900 mg/kg, whereas for 2,6-dimethyl-3,5-dicarboethoxy-1,4-dihydropropyridine it exceeds 32,000 mg/kg. Repeated daily administration per os of 2,6-dimethyl-3,5-dicarboethoxy-1,4-dihydropyridine to white rats in doses of 20 mg/kg during 6 months causes no toxic symptoms in the animals.

This is a sound proof of the fact that the herein-proposed compounds conforming to the general formula (I) are at least 11 times less toxic than ethoxychin.

When bacon pigs are fed with products containing grass flour stabilized with 2,6-dimethyl-3,5-dicarboethoxy-1,4-dihydropyridine, the accumulation of vitamin A in their liver increases from 7.7 to 15.6 mcg/g, i.e., twice as much.

It should also be pointed out, that the compounds conforming to the general formula (I) are advantageous in being produced by a simple and effective method, residing in reacting acyl acetone or acetoacetic ester with urotropin in the presence of ammonium acetate in an organic solvent, such as isopropanol. The compounds conforming to the general formula (I), produced by this method, are obtained in the form of crystalline substances, with a yield equal to 80–85 percent of the theoretical amount.

The compounds conforming to the general formula (I) are stable when stored in conventional packages, such as polyethylene sacks, and do not feature any caustic or destructive properties.

Given hereinbelow are example, illustrating the application of some of the compounds belonging to the said group. It should be pointed out, that the application of the compounds conforming to the general formula (I) as carotene stabilizers in fodder products is in no way limited to the examples that follow.

EXAMPLE 1

Solutions of carotene in sunflower oil were used, the concentration of carotene therein being 100 γ/ml. To 25 ml of siad solution there were added 0.01 g of 2,6-diemthyl-3,5-dicarboethoxy-1,4-dihydropyridine (III), or 0.01 g of 2,6-dimethyl-3,5-diacetyl-1,4-dihydropyridine, or 0.01 g of ethoxychin. The resulting solutions were placed into a temperature-controlled cabinet and kept there over a period of 72 hours at a temperature of 70°C. The content of carotene in the samples was determined colorimetrically.

The obtained results are presented in Table 1.

Table 1

| Compounds tested | In oil solution | |
|---|---|---|
| | Quantity of compound, % | Residual quantity of carotene, in %, as against initial quantity (after 72 hrs) |
| Blank stock | — | 70 |
| Ethoxychin | 0.04 | 85 |
| Compound III | 0.04 | 86 |
| Compound II | 0.04 | 82 |

The obtained data indicate, that 3,5-dicarbonyl derivatives of 2,6-dimethyl-1,4-dihydropyridine feature practically the same antioxidant properties with respect to thermal autooxidation of carotene, as ethoxychin. The comparison of the carotene-stabilizing activity of 2,6-dimethyl-3,5-dicarboethoxy-1,4-dihydropyridine (III) and 2,6-dimethyl-3,5-diacetyl-1,4-dihydropyridine (II) shows, that the activity of 2,6-dimethyl-3,5-dicarboethoxy-1,4-dihydropyridine is somewhat higher.

EXAMPLE 2

Grass flour was used, prepared from cultivated fodder grass by artificial drying thereof in high-temperature driers. 500 kg of dry grass flour were treated in a mixer with 5 lit. of a 2 percent solution of 2,6-dimethyl-3,5-dicarboethoxy-1,4-dihydropyridine in a vegetable oil. After the mixing, the resulting stabilized grass flour was packaged in sacks and stored in a flat storage. The content of carotene in the samples was assayed once a month over a period of 6 months.

The variations observed in the content of carotene in the nonstabilized grass flour and in that stabilized with ethoxychin and with 2,6-dimethyl-3,5-dicarboethoxy-1,4-dihydropyridine (III) are illustrated in Table 2, for the storage conditions as specified hereinabove.

Table 2

| Storage time, days | Ambient temperature,°C | Relative humidity, % | Carotene content in grass flour, mg/kg | | | Increase in carotene preservation with the use of (%): | |
|---|---|---|---|---|---|---|---|
| | | | Nonstabilized | Stabilized with ethoxychin | Stabilized with compd. III | Ethoxychin | Compd. III |
| 0   | +8.0  | 86 | 169 | 153 | 154 | —    | —    |
| 30  | −7.5  | 90 | 137 | 151 | 153 | +17.6 | +18.3 |
| 60  | −3.5  | 90 | 129 | 149 | 151 | +21.1 | +21.8 |
| 90  | −18.1 | 62 | 118 | 150 | 150 | +28.1 | +27.6 |
| 120 | −2.5  | 75 | 106 | 140 | 145 | +28.8 | +31.5 |
| 150 | −6.7  | 64 | 97  | 131 | 134 | +28.2 | +28.6 |
| 180 | +10.3 | 75 | 83  | 115 | 120 | +26.1 | +28.8 |

As can be seen from the data presented in Table 2, the content of carotene in grass flour stabilized with 2,6-dimethyl-3,5-dicarboethoxy-1,4-dihydropyridine, after storage over a period of 6 months, proves to be 28.8 percent higher than in non-stabilized grass flour. Under similar conditions, ethoxychin enhances the preservation of carotene by 26.1 percent, this being 2,7 percent less than in case of using 2,6-dimethyl-3,5-dicarboethoxy1,4-dihydropyridine.

What is claimed is:

1. A method of stabilizing carotene contained in fodder products, such as grass flour, comprising treating said fodder products with a 3,5-dicarbonyl derivative of 2,6-dimethyl-1,4-dihydropyridine, conforming to the general formula:

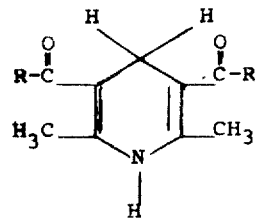

where R is selected from the group consisting of a lower alkyl and an alkoxy, said derivative being taken in the form of a solution in ethanol or in isopropanol or in a vegetable oil in such an amount that the content of the stabilizer in the resulting fodder product is 0.2 g per kg.

2. A method of stabilizing carotene in an oil solution comprising introducing into said oil solution a 3,5-dicarbonyl derivative of 2,6-dimethyl-1,4-dihydropyridine conforming to the general formula:

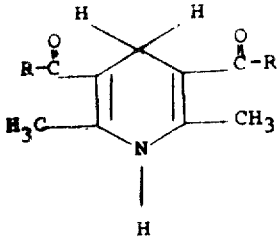

where R is selected from the group consisting of a lower alkyl and an alkoxy, said derivative being taken in an amount of 0.04 percent by weight of said oil solution of carotene.

* * * * *